United States Patent

[11] 3,551,690

| [72] | Inventor | Adrianus Korpel |
| | | Prospect Heights, Ill. |
| [21] | Appl. No. | 615,398 |
| [22] | Filed | Feb. 13, 1967 |
| [45] | Patented | Dec. 29, 1970 |
| [73] | Assignee | Zenith Radio Corporation |
| | | Chicago, Ill. |
| | | a corporation of Delaware |

[54] WAVE GENERATOR
8 Claims, 9 Drawing Figs.

| [52] | U.S. Cl. | 307/88.3, 329/69; 330/4.5; 350/161 |
| [51] | Int. Cl. | H03f 7/00 |
| [50] | Field of Search | 307/88.3; 329/69; 330/4.5; 350/161 |

[56] References Cited
UNITED STATES PATENTS

| 3,174,044 | 3/1965 | Tien | 332/7.51 |
| 3,469,107 | 9/1969 | Townes et al. | 307/88.3 |

*Primary Examiner*—John Kominski
*Assistant Examiner*—Darwin R. Hostetter
*Attorneys*—Francis W. Crotty and Hugh H. Drake

ABSTRACT: Electromagnetic waves, e.g., millimeter waves, are generated in an electro-optic material by directing a beam of electromagnetic radiation such as light at an angle, to the path of the generated waves, corresponding to the complement of the negative Bragg angle of interaction at the two different frequencies of the waves in the beam and the generated waves. In another aspect, wave energy is caused to propagate around a closed loop path in a ring-type cavity and a beam of electromagnetic waves is directed across the waves in the closed loop path at the Bragg angle; in this case, the waves propagated in that path may be either acoustic or electromagnetic waves.

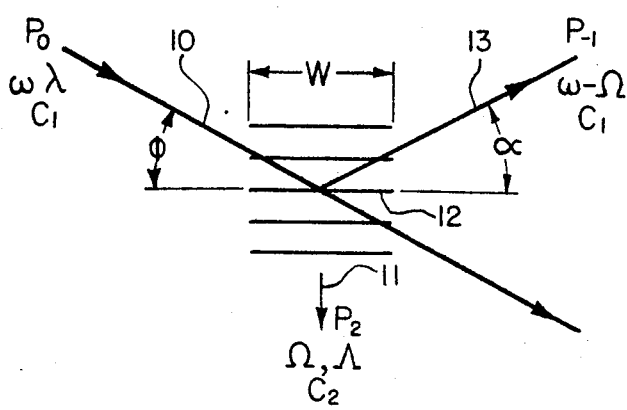
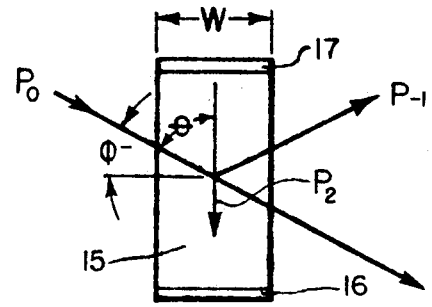
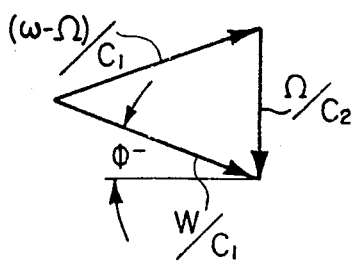
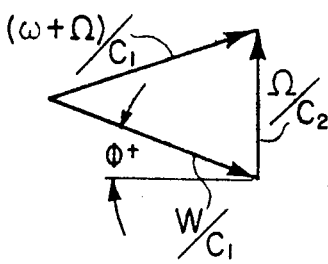
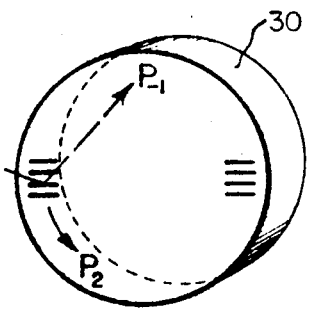
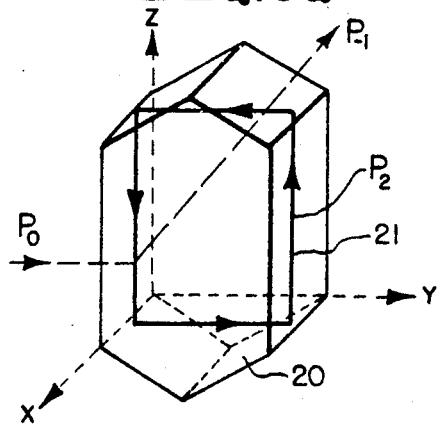
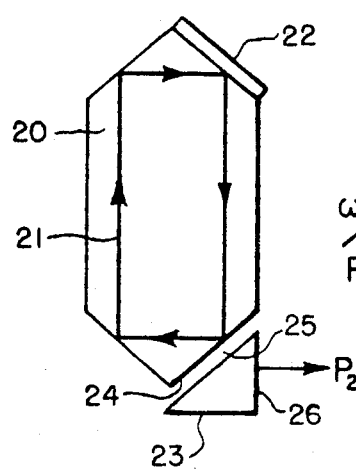
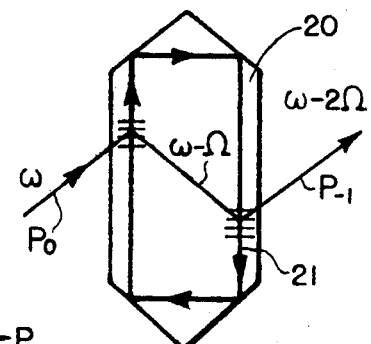
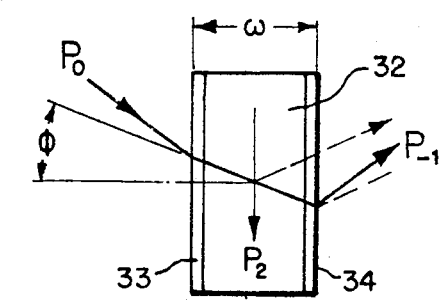
Inventor
Adrianus Korpel
By *Hugh D. Drake*
Attorney

WAVE GENERATOR

The present invention pertains to a wave generator. It is particularly directed to the generation of electromagnetic waves of millimeter wavelengths, for example, but in certain aspects is also of utility in the development of acoustic waves.

As described in the copending application of Robert Adler, Ser. No. 388,589, filed Aug. 10, 1964, light waves may be caused through an interaction process to develop acoustic waves in a medium which propagates the latter along a particular path. For this purpose, the light waves enter the medium at an angle, to the wavefronts of the acoustic waves to be developed, corresponding to the Bragg angle at the frequencies of the two different waves. As disclosed in that application, difficulty is encountered if the developed acoustic waves are permitted to be reflected. Moreover, the amount of power transferable from the light beam to the acoustic waves in the device of the application is limited to an extremely small amount.

It is a general object of the present invention to provide a new and improved wave generator incorporating certain principles of the technique described in the aforementioned Adler application but overcoming the difficulties mentioned with respect thereto.

Another object of the present invention is to provide a new and improved wave generator particularly suitable to the generation of electromagnetic waves.

One specific object of the present invention is to provide a new and improved wave generator of the foregoing character which is capable of achieving increased transfer of power from the incident beam to the generated wave energy.

A wave generator constructed in accordance with the present invention includes a medium capable of propagating electromagnetic waves of predetermined frequency along a predetermined path. A beam of electromagnetic waves, of a given frequency different from that predetermined frequency, is directed into the medium across and at an angle to the aforementioned path. That angle corresponds to the complement of the negative Bragg angle of interaction at the two different frequencies in order to generate the predetermined-frequency waves. Finally, the generator includes means along the path receptive of the predetermined-frequency waves. In another aspect of the invention, a wave generator includes a medium defining a ring-type cavity capable of propagating wave energy of predetermined frequency along a closed-loop path. As described above, a beam of electromagnetic waves of a different frequency are directed into the medium across the path at the corresponding Bragg angle.

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements, and in which:

FIG. 1 is a schematic diagram useful in explaining the principles involved;

FIGS. 2 and 3 are vector diagrams which also contribute to an understanding of those principles;

FIG. 4 is a schematic diagram of one embodiment of the present invention;

FIGS. 5a and 5b are schematic diagrams explanatory of an alternative embodiment;

FIG. 6 is a schematic diagram of another alternative embodiment;

FIG. 7 is a schematic diagram of a modification applicable to any of the devices of FIGS. 4, 5a, 5b and 6; and FIG. 8 is a schematic diagram of still another embodiment.

FIG. 1 illustrates Bragg angle interaction between electromagnetic waves following a path 10 and wave energy traveling in the direction of a path 11; in this case, the waves in path 10 are optical, constituting a beam of light. As used herein, the term "light" refers to optical electromagnetic radiation in either the visible or invisible portions of the spectrum. The wave energy in path 11 has wavefronts 12 of width $w$ and the light beam intersects those wavefronts at an angle $\Phi$. The incoming light has a power $P_o$, a frequency $\omega$, a wavelength $\lambda$ and a velocity $c_l$. A portion of the light in path 10 is deflected to emerge along a path 13, which forms angle $\alpha$ to wavefronts 12 as a result of the light being diffracted by those wavefronts, and has a power $P_{-1}$, a frequency of a value $\omega-\Omega$ and a velocity $c_l$. When the wave energy in path 11 is in the form of acoustic waves propagating in water, angles $\Phi$ and $\alpha$ are equal; in other cases, such as when millimeter waves propagate in an electro-optic material, those two angles typically are unequal. The wave energy propagating along path 11 in the direction indicated has a power $P_2$, a frequency $\Omega$, a wavelength $\Lambda$ and a velocity $c_2$.

The interaction process which causes part of the light beam to be changed in direction involves a transfer of power between the light and the wave energy in path 11. For the case illustrated in FIG. 1, that power is transferred from the light beam to the other wave energy as a result of which all the light emerging from the interaction region has a total power which is less than the incident power $P_o$. Also as a necessary incident of such interaction, the frequency of the deflected portion of the light is changed in an amount equal to the frequency of the wave energy propagating along path 11. Thus, the frequency of emerging light beam 13 is equal to the difference of the other two frequencies as indicated in FIG. 1.

Bragg angle interaction is also obtained when the direction of path 11 is reversed relative to that shown in FIG. 1. In this case, power from the wave energy in path 11 is transferred to the light and correspondingly the frequency of the deflected light emerging from the interaction region is increased to a value $\omega+\Omega$, the sum of the other two frequencies. That is, the interaction process is analogous to that of modulation; in one case an upper sideband is produced and in the other case, as actually illustrated in FIG. 1, a lower sideband is produced. These sidebands appear as the deflected light emerging from the interaction region.

FIG. 1 is drawn to indicate that the wave energy in path 11 exists prior to interaction with light beam 10. In this case, then, the indicated power $P_2$ is intended to represent the additional power increment which is given to that wave energy as a result of the interaction with the light. However, the same process is capable of initiating the development of that wave energy in path 11. That is, a medium is provided which is capable of propagating the wave energy in the direction of path 11 and light beam 10 acts to perturb that medium and generate the wave energy; in that instance, power $P_2$ represents the total power in the wave energy along path 11. In the systems to be described hereinafter, the primary consideration is that of initially generating the wave energy by an interaction with the incoming light or equivalent radiation, although the same principles are applicable for increasing the power level of wave energy already existing. Accordingly, the term "generator" as utilized herein and in the claims is defined to embrace the initial generation of wave energy as well as the amplification of wave energy already existing.

The energy relationships involved are illustrated by the momentum diagrams of FIGS. 2 and 3. Thus, a first vector $\omega/c_1$ represents the incoming light along path 10 at an angle $\Phi-$ with a normal to a vector $\Omega/c_2$ oriented in the direction of path 11. The momentum triangle is completed by a third vector representing the deflected emerging light and of a magnitude $(\omega-\Omega)/c_1$. The symbol $\Phi-$ is chosen to indicate the negative Bragg angle condition, that condition at which the emerging light represents a lower sideband. On the other hand, FIG. 3 shows the momentum diagram for the condition in which the direction of the wave energy in path 11 is reversed so that positive Bragg angle diffraction occurs and power is transferred from the wave energy in path 11 to the emerging light beam. Hence, the angle is denoted $\Phi+$ and the emerging light beam is represented by a vector having a magnitude $(\omega+\Omega)/c_1$. The other magnitudes are the same as in FIG. 2.

From the momentum diagram of FIG. 2, the necessary value of the Bragg angle for the desired interaction can be determined from the relationship $$\sin \phi^- = \lambda/2\Lambda[1-(c_2/c_1)^2] + c_2/c_1 \quad (1)$$

On the other hand, for the positive Bragg diffraction condition of FIG. 3, the relationship is $$\sin \phi^+ = \lambda/2\Lambda[1-(c_2/c_1)^2] - c_2/c_1 \quad (2)$$

The ratio of the deflected to input light beam powers is expressed $$P_{-1}/P_o = \sin^2(\Delta\phi/2) \quad (3)$$

where $\Delta\Phi$ is the peak phase delay of the incoming light upon traversing the medium in which the wave energy in path 11 is propagating. This phase delay may be represented $$\Delta\phi = \Delta\beta w = \Delta(2\pi n_1/\lambda)w = \beta_o \Delta n_1 w \quad (4)$$

where $\beta$ is the actual propagation constant of the light, $\beta_o$ is the vacuum propagation constant, and $n_1$ is the refractive index of the medium to the light. For a small degree of interaction as is typical in practice, $$P_{-1}/P_o = \frac{\beta_o^2 (\Delta n_1)^2 w^2}{4} \quad (5)$$

Generally, $$(\Delta n_1)^2 = CP_2 \quad (6)$$

where C is a constant pertaining to the material of the medium propagating the wave energy along path 11. Consequently, $$P_{-1}/P_o = \frac{\beta_o^2 C P_2 w^2}{4} \quad (7)$$

For every photon generated in $P_{-1}$ one additional photon or phonon is delivered to $P_2$. Hence, $$\Delta P_2 = \Omega/\omega - \Omega \beta_o^2 C/4 P_2 P_o w^2 \quad (8)$$

From the foregoing, the gain, the power transferred from the light beam to the wave energy in path 11, is expressed:

$$\Delta P_2/P_2 = \Omega/\omega - \Omega \beta_o^2 C/4 P_o w^2 \quad (9)$$

In a typical case, $\Omega$ is much smaller than $\omega$ as a result of which $$\Omega/\omega - \Omega \approx \Omega/\omega \quad (10)$$

Equation (10) describes the gain resulting from one pass of the light beam through the interaction region. For the technique to be operative, this gain must be larger than the inherent losses in the system. That is, all losses in the system establish a certain threshold condition for a single interaction. The maximum amount of power which can be extracted from the light beam is represented by the quantity $$\Omega/\omega P_o \quad (11)$$

To increase the gain, it is desirable to cause the interaction to occur repeatedly. To this end, the wave energy being generated (or amplified) is caused to multiply traverse the light beam. In this situation, once the gain for a single interaction exceeds the threshold condition, the interaction is cumulative and builds up to a saturation level. FIG. 4 illustrates one arrangement in which these ends are achieved. In FIG. 4, the generated wave energy is propagated by a body 15 of an electro-optic material such as lithium niobate (LiNbO$_3$). The generated wave energy is electromagnetic and preferably has a frequency in the millimeter wavelength region. Consequently, to reduce the possibility of confusion with the incoming electromagnetic radiation, here in the form of light, the generated wave energy when of an electromagnetic nature will hereafter be referred to as millimeter waves.

Disposed individually on opposite end faces of body 15 are reflectors 16 and 17, receptive and reflective of the millimeter waves and defining a cavity optically resonant thereto so that at least a significant portion of the millimeter waves is reflected repeatedly back and forth between the reflectors. By analogy to FIG. 1, the millimeter waves which are generated and amplified are indicated by the arrow labeled $P_2$, the incoming light beam is represented by the arrow labeled $P_o$ and the emerging deflected light beam by the arrow $P_{-1}$. The incoming light beam forms the negative Bragg angle $\Phi-$ to the wavefronts of the millimeter waves and, for convenience of later reference, that Bragg angle $\Phi-$ is the complement of an angle $\Theta$ between the incoming light waves and the direction of millimeter wave propagation.

In operation, the millimeter waves are amplified on each passage through the light beam in the direction at which negative Bragg diffraction of the light occurs. At the same time, in each passage of the millimeter waves in the opposite direction they are attenuated by the resulting positive Bragg diffraction. Thus, in order to obtain useful ultimate amplification of the millimeter waves it is necessary that the millimeter waves do not interact with the light upon their return or positive-diffraction-direction passages. It can be shown that the tolerance for interaction around the Bragg angle $\Phi-$ is of the order $\Lambda/w$. Hence, the conditions for achieving the desired negative Bragg diffraction while avoiding positive Bragg diffraction on the return trip are expressed $$\phi^- - \phi^+ > \Lambda/w \quad (12)$$

For the usually small ratio of $c_2/c_1$, Equation (12) expresses the condition that $$2c_2/c_1 > \Lambda/w \quad (13)$$

An examination of Equation (13) reveals that this condition may be satisfied for the development of millimeter waves.

It is known that Bragg-diffraction interaction also may occur between acoustic waves propagating in a medium such as water and a light beam. In that case, however, Equation (13) reveals immediate difficulty encountered when it is attempted to multiply reflect the acoustic waves in a coincident cavity of the kind shown in FIG. 4. That is, in the case of interaction between light and sound the ratio of $c_2$ to $c_1$ is of the order of $10^{-5}$. Consequently, the acoustic waves returned in the positive Bragg-direction also interact with the light and are thereby attenuated, canceling the effect of the gain introduced during passage of the acoustic waves in the other direction.

To the end of avoiding such undesired cancellation in the case of acoustic waves, it is contemplated to propagate the acoustic waves in a ring-type cavity in which those waves are caused to travel in a closed loop. Moreover, this very same approach likewise may be utilized for the generation of electromagnetic waves, particularly in those cases where, by reason of the parameters selected, the condition represented by Equation (13) cannot be satisfied. Therefore, since this approach is applicable to generation or amplification either of acoustic waves or millimeter waves, for convenience the remaining description will be primarily limited to the case of millimeter-wave generation.

FIGS. 5a and 5b illustrate an exemplary ring-type cavity configuration. In this case, the electro-optic material is in the form of a block 20 having a hexagonal circumference, as defined in the $y-z$ plane, in a closed loop 21 as shown. The incoming light beam $P_o$ and the emerging deflected light beam $P_{-1}$ follow paths lying in a plane parallel to the $x-z$ plane, and the incoming light beam is in a position so as to interact with the millimeter waves in but one portion of closed-loop path 21. As before, the incoming light beam is oriented relative to the millimeter wavefronts so as to interact therewith at the negative Bragg angle. Consequently, on each passage of a millimeter wavefront through the light beam, energy is transferred from the latter to the millimeter waves. For clarity in this and the subsequent figures, the undeflected portion of the emerging light is omitted from the drawing. FIG. 5b illustrates refinements upon the structure of FIG. 5a to enable reception and extraction of the millimeter wave energy. In one approach, all but one of the faces of block 20 upon which the millimeter waves are incident is ground or coated so as to be highly reflective of those waves. The remaining one of those faces is partially transparent to the millimeter waves so that a portion of the latter energy emerges from it. This is illustrated in FIG. 5b where reflector 22 is in the form of a layer affixed to a face on block 20. Such partially-reflective layers conventionally are multiple-layer films of dielectric material and are utilized frequently as the cavity-defining reflectors of present-day lasers.

As an alternate way of extracting millimeter wave energy from block 21, a triangularly-shaped section 23 of electro-optic material is disposed closely adjacent to one of the reflecting faces 24 of block 20 to define a space 25 between face 24 and section 23. Space 25 has a thickness of the order of the millimeter wavelength Λ. The presence of section 23 serves to partially frustrate the otherwise total internal reflection of the millimeter waves off face 24. As a result, millimeter wave energy is received and coupled out of block 20 into section 23 from which it is radiated off one of its exposed faces 26 as indicated by the arrow labeled $P_2$. It may be noted that the same principle of reflection frustration also may be employed when the generated or amplified waves on path 21 are acoustic waves. In this case, however, space 25 is filled with an acoustically-conductive medium, having an acoustic impedance of such a value as to ensure optimum power output.

FIG. 6 illustrates another ring-type cavity which is known, per se, in a noninteracting environment. In this case, the electro-optic material is in the form of a disc 30 and the millimeter wave energy is propagated within the disc circumferentially around the disc near its cylindrical surface. The millimeter waves in this arrangement are propagated in what are known as whispering modes. As shown, the incoming light beam $P_0$ is directed in a plane perpendicular to the flat faces of the disc and at an angle to the sound wavefronts again in correspondence with the negative Bragg diffraction angle.

Because the whispering modes traverse a closed-loop path, disc 30 again defines a ring-type cavity and the millimeter waves repeatedly traverse the light beam in but one direction. Extraction of the millimeter wave energy from the cavity may be achieved as in FIG. 5b by disposing a coupling element adjacent to the curved surface of the disc so as to frustrate the otherwise total internal reflection provided by that curved surface.

In order to reduce the level of the aforementioned threshold condition, it is further contemplated to cause the incident light to be multiply reflected within the millimeter wave propagating cavity. To that end, FIG. 7 depicts an element 32 in which the millimeter waves $P_0$ are propagated as indicated. The sidewalls of element 32, upon one of which light beam $P_0$ is incident, are coated with respective reflectors 33 and 34 which are highly reflective at the wavelength of the incoming light. At the same time, width $w$ is selected so that the effective one-way optical path length between reflectors 33 and 34, including the effect of the index of refraction of element 32 for the light, is equal to an integral multiple of one-half the wavelength λ of the light. In this way, element 32 not only propagates the millimeter waves but also functions as a Fabrey-Perot interference filter for the light. As is well understood, as such, the interference filter is highly transmissive to light of the wavelength at which it is made resonant by the described choice of width $w$. However, in passing through such an interference filter, the light is caused to be multiply reflected many times within the filter (in element 32) back and forth between reflectors 33 and 34. Consequently, Bragg interaction between the light and the millimeter waves occurs repeatedly for a single overall translation of the light into and out of element 32. The interaction efficiency is thereby significantly increased.

It will be noted in FIG. 7 that the actual angle of incidence of the incoming light beam is slightly greater than the negative Bragg angle Φ− in order to allow for the bending of the light beam as it passes through reflector 33. Within element 32, the light beam interacts with the millimeter wavefronts at that negative Bragg angle. The emerging deflected light beam $P_{-1}$ also exits from reflector 34 at a modified angle. As noted, the cavity width $w$ is chosen so that it constitutes an interference filter resonant for the frequency ω at the incidence angle Φ−. Because the difference-frequency light ω−Ω is generated inside element 32, the interference filter must also be resonant at that latter frequency. Fortunately, this condition is automatically satisfied when the incoming light beam $P_0$ is caused to enter at the proper angle as described.

For N single passes of the light beam through the millimeter waves, the equivalent interaction length $w_{eq}$ is equal to $Nw$. Consequently, utilizing the interference-filter approach, Equation (9) is modified so that the gain is expressed $$\Delta P_2/P_2 = \Omega/\omega - \Omega B_0^2 C/4P_0\omega^2 N^2 \qquad (14)$$

AEquation (14) indicates that the threshold power required for operation is decreased by the value $N^2$ by virtue of adoption of the interference-filter technique. Reflectors 33 and 34 typically having a reflectivity of 99.5 percent, N is of the order of one hundred and thus the threshold conditions for operation are lowered by a factor of $10^4$.

The technique illustrated with reference to FIG. 7 may be adapted as a modification to any of the devices illustrated in the other figures. That is, reflectors 33 and 34 may be placed upon the light entrance and emergence faces of body 15, block 20 or disc 30 and the width of the millimeter-wave propagating element is selected to satisfy the optical path length condition needed for interference-filter action. The light falling on an interference-filter cavity may be in the form of a broad beam. Alternatively, it may be a very narrow beam caused to enter within the cavity through a small hole in reflector 33.

Instead of entering block 20 of FIG. 5a in a plane parallel to the $x-z$ axis, the incoming light $P_0$ may be directed in the plane of closed loop path 21 as illustrated in FIG. 8. By this means, the light beam is caused to twice traverse the closed-loop path. The reflective end faces of block 20 are so slanted that each interaction of the light with the millimeter waves is at the negative Bragg angle. After the first such interaction, the diffracted light has a frequency ω−Ω the same as before. However, after the second diffraction the emerging light $P_{-1}$ has a frequency ω − 2Ω. Consequently, the efficiency of the system is correspondingly increased. Thus, Equation (11) is modified to become $$P_2 = 2\Omega/\omega P_0 \qquad (15)$$

ABy the use of more complex cavities in which the millimeter waves are reflected an additional number of times, still additional regions of interaction between the light and the millimeter waves may be obtained to increase the overall conversion efficiency. Each time, the light frequency is lowered by the millimeter-wave frequency Ω and, in principle, all of the light eventually may be converted into millimeter waves.

For the millimeter-wave case, using an electro-optic material, it can be shown that the gain G is in accordance with the relationship $$G = \Omega/\omega \pi^2/2\lambda^2 n_1^6 r^2/n_2(w/h)Z_0 P_0 \qquad (16)$$

Awhere $Z_0$ is the characteristic impedance of free space, $n_1$ is the refractive index of the electro-optic material to the light, $r$ is a constant of the material, $h$ is the height of the light beam as measured into the plane of the paper, and $n_2$ is the refractive index of the electro-optic material for the millimeter waves. Utilizing light of a wavelength of $0.5 \times 10^{-3}$ millimeters to generate millimeter waves having a wavelength of 1 millimeter in free space and the previously suggested lithium niobate as the electro-optic material, $r$ is approximately $30 \times 10^{-12}$ meters per volt. $Z_0$ is 372 ohms. $n_1$ is approximately 2.3 and $n_2$ is approximately 5. The ratio Ω/ω is $0.5 \times 10^{-3}$. Utilizing a ratio $w/h$ of 10, the gain for a single pass is $1.2 \times 10^{-6} P_0$. By itself, this value is of course very small and the incoming beam power would have to be correspondingly large to achieve meaningful operation. However, the use of the cavity technique described enables an increase of the gain by a factor of 10⁴. Similar calculations with respect to acoustic waves reveal the achievement of gains of like magnitude.

The apparatus described enables the generation or amplification of millimeter waves by directly converting the energy in a light beam. Certain of the arrangements described also enable the similar development of acoustic waves from a light beam at utilizable levels of power. The arrangements disclosed also permit increased efficiency by increasing the amount of the available incident light which is converted into the electromagnetic or acoustic-wave energy. Adaptations of the systems in the manners indicated enable considerable flexibility in the design of generation systems utilizing the principles herein disclosed.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. Apparatus for converting primary electromagnetic wave energy of a first predetermined frequency to secondary wave energy of acoustic or electromagnetic nature and of a second, lower, predetermined frequency, and amplifying said secondary wave energy by successive interactions with the primary wave energy, comprising:

a source of coherent primary electromagnetic waves of said first predetermined frequency propagating said waves in a first predetermined path;

means comprising a resonant cavity tuned to said second predetermined frequency interposed in said first path for propagating secondary waves of said second predetermined frequency along a second predetermined path at an angle corresponding to the complement of the negative Bragg angle of interaction at said first and second predetermined frequencies and for obtaining successive amplifying interactions of said secondary waves with said primary waves while avoiding attenuating interactions between said waves; and utilization means coupled to said cavity for extracting amplified secondary wave energy at said predetermined second frequency.

2. Apparatus according to claim 1 wherein said secondary wave energy is nonacoustic in nature, and said resonant cavity comprises two parallel opposed flat surfaces bounding a wave propagation path whose length is integrally related to the wavelength at said second predetermined frequency.

3. Apparatus according to claim 1 in which said resonant cavity is a ring-type cavity having a wave propagation path whose length is integrally related to the wavelength at said second predetermined frequency.

4. Apparatus according to claim 1, in which means are provided for directing said coherent electromagnetic waves of said first predetermined frequency across said path at least twice, each time at an angle corresponding to the complement of the negative Bragg angle of interaction at said first and second predetermined frequencies.

5. Apparatus according to claim 1, in which said medium is a disc in which said waves of said second predetermined frequency are propagated circumferentially as whispering modes.

6. Apparatus according to claim 1, in which said utilization means includes a reflector at least partially transparent to said electromagnetic or acoustic wave energy at said second predetermined frequency.

7. Apparatus according to claim 1, in which said utilization means includes a reflector of said electromagnetic or acoustic wave energy at said second predetermined frequency and further includes means adjacent to said reflector for partially frustrating reflections of said waves of said second predetermined frequency to extract energy from said cavity.

8. Apparatus according to claim 1, in which said second predetermined frequency is a millimeter-wave frequency.